US008467783B2

(12) United States Patent
Li et al.

(10) Patent No.: US 8,467,783 B2
(45) Date of Patent: Jun. 18, 2013

(54) METHOD AND DEVICE FOR DETERMINING MOBILITY OF ROAMING USER TERMINAL

(75) Inventors: Bojie Li, Shenzhen (CN); Lei Lu, Shenzhen (CN); Wenliang Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 365 days.

(21) Appl. No.: 12/774,989

(22) Filed: May 6, 2010

(65) Prior Publication Data

US 2011/0105115 A1 May 5, 2011

Related U.S. Application Data

(63) Continuation of application No. PCT/CN2009/072075, filed on Jun. 1, 2009.

(30) Foreign Application Priority Data

Jul. 29, 2008 (CN) .......................... 2008 1 0142559

(51) Int. Cl.
*H04W 4/00* (2009.01)
(52) U.S. Cl.
USPC .................. 455/432.1; 455/435.1; 455/422.1; 455/442; 370/328; 370/338
(58) Field of Classification Search
USPC ................ 455/432.1–433, 435.1–439, 422.1, 455/442; 370/328–338
See application file for complete search history.

(56) References Cited

U.S. PATENT DOCUMENTS

| 8,045,959 B1* | 10/2011 | Rosenberg et al. ........... 455/411 |
| 2002/0188562 A1* | 12/2002 | Igarashi et al. ................. 705/40 |
| 2004/0208153 A1* | 10/2004 | Mizell et al. .................. 370/338 |
| 2008/0133606 A1 | 6/2008 | Dang et al. |
| 2009/0176496 A1 | 7/2009 | Li et al. |
| 2009/0196265 A1* | 8/2009 | Mariblanca Nieves et al. ............................. 370/338 |

FOREIGN PATENT DOCUMENTS

| CN | 1610420 A | 4/2004 |
| CN | 1610420 A | 4/2005 |
| CN | 101094063 A | 12/2007 |

(Continued)

OTHER PUBLICATIONS

Nortel, "Mobility Restriction," WiMAX Forum, Apr. 24, 2008, 17 pages.

(Continued)

*Primary Examiner* — Chuong A Ngo
(74) *Attorney, Agent, or Firm* — Slater & Matsil, L.L.P.

(57) ABSTRACT

A method determines mobility of a roaming user terminal. A visited access service network (ASN) authenticator receives an Access-Accept message sent from a visited network authentication, authorization and accounting (V-AAA) server. The authenticator determines a mobility access classifier of the terminal according to a mobility restriction policy of a visited ASN, and sends the mobility access classifier of the terminal to a base station (BS). A device for determining mobility of a roaming user terminal is also provided. With the method and device for determining mobility of a roaming user terminal, after the user terminal roams to a visited network with mobility restriction or to a network without mobility restriction from a network with mobility restriction, the mobility restriction type of the user terminal can be determined in time, and the visited network can acquire the mobility restriction information of the user terminal.

3 Claims, 2 Drawing Sheets

FOREIGN PATENT DOCUMENTS

| CN | 101147413 A | 3/2008 |
|---|---|---|
| CN | 101198186 A | 6/2008 |
| CN | 101640919 A | 2/2010 |
| WO | WO 2007/091103 A1 | 8/2007 |
| WO | WO 2008/019631 A1 | 2/2008 |

OTHER PUBLICATIONS

"WiMAX Forum™ Network Architecture; Stage 3; Detailed Protocols and Procedures; DRAFT-T33-001-R015v01-M," Base Specification, Jul. 28, 2009, 1162 pages, 2007-2009 WiMAX Forum.

"WiMAX Forum™ Network Architecture; Stage 3; Detailed Protocols and Procedures; DRAFT-T33-001-R015v01-M, Part 1," Base Specification, Part 1, Jul. 28, 2009, 616 pages, 2007-2009 WiMAX Forum.

"WiMAX Forum™ Network Architecture; Stage 3; Detailed Protocols and Procedures; DRAFT-T33-001-R015v01-M, Part 2," Base Specification, Part 2, Jul. 28, 2009, 413 pages, 2007-2009 WiMAX Forum.

Chinese Office Action, Chinese Application No. 200810142559.2, Dated: Sep. 29, 2010, 9 pages.

"Part 16: Air Interface for Fixed and Mobile Broadband Wireless Access Systems," IEEE Standard for Local and Metropolitan Area Networks, Oct. 2004, pp. 1-893, IEEE Std. 802.16™ -2004, The Institute of Electrical and Electronics Engineers, Inc., New York, New York, United States.

"Part 16: Air Interface for Fixed and Mobile Broadband Wireless Access Systems, Amendment 2: Physical and Medium Access Control Layers for Combined Fixed and Mobile Operation in Licensed Bands," IEEE Standard for Local and Metropolitan Area Networks, Feb. 2006, pp. 1-864, IEEE Std. 802.16e™ -2005 and Std. 802.16™ 2004/Cor1-2005, The Institute of Electrical and Electronics Engineers, Inc., New York, New York, United States.

Ma, D., et al., "Fixed Mobility Based on Geographic Location," Jun. 20, 2007, 5 pages, Motorola Inc.

Written Opinion of the International Searching Authority, International Application No. PCT/CN2009/072075, Applicant: Huaweu Technologies Co., Ltd., et al., Dated: Sep. 10, 2009, 4 pages.

Chinese Office Action, Chinese Application No. 200810142558.8, Applicant: Huawei Technologies Co., Ltd., Dated: Nov. 12, 2010, 13 pages.

Extended European Search Report, European Application No. 09802370.8-1249 / 2217025, PCT/CN2009/072075, Applicant: Huawei Technologies Co., Ltd., Dated: Apr. 6, 2011, 9 pages.

International Search Report, International application No. PCT/CN2009/072075, Date of mailing of the international search report Sep. 10, 2009, 4 pages.

\* cited by examiner

METHOD AND DEVICE FOR DETERMINING MOBILITY OF ROAMING USER TERMINAL

This application is a continuation of International Application No. PCT/CN2009/072075, filed on Jun. 1, 2009, which claims priority to Chinese Patent Application No. 200810142559.2, filed on Jul. 29, 2008, both of which are hereby incorporated by reference in their entireties.

TECHNICAL FIELD

The present invention relates to the field of communications technology, and more particularly to a method and a device for determining mobility of a roaming user terminal.

BACKGROUND

The worldwide interoperability for microwave access (WiMAX) is a wireless metropolitan area network (MAN) technology based on the IEEE802.16 standard. The WiMAX network wireless side is a wireless MAN access technology based on the IEEE802.16d/e standard and adopts the orthogonal frequency division multiplexing (OFDM) and OFDM access (OFDMA) physical layer technology, which can effectively resist multipath fading. At the optimal channel fading condition, the transmission speed may approach 75 Mbps.

The entire WiMAX network mainly includes three parts, namely, a user terminal, an access service network (ASN), and a connectivity service network (CSN).

(1) The user terminal is a subscriber station (SS) or a mobile station (MS), which is provided for a user to access the WiMAX network.

(2) The ASN is defined as a network function collection for providing wireless access services for the WiMAX user terminal. The ASN includes a base station (BS) network element and an ASN gateway (ASN-GW) network element. The main functions of the BS network element include providing a Layer 2 (L2) connection between a BS and a user terminal, a radio resource management, and so on. The main functions of the ASN-GW network element include providing a client function for the user terminal authentication, authorization, and accounting functions, and providing a relay function (for example, IP address allocation), or intra-ASN handover of Layer 3 (L3) information for the user terminal.

(3) The CSN is defined to provide an IP connection service for the WiMAX user terminal. The CSN mainly includes logical entities such as a pre-paid server and an authentication, authorization and accounting (AAA) server. The main functions provided by the CSN include IP address allocation for the user terminal, Internet access, AAA proxy or AAA server, a user terminal-based authorization control, and so on.

In order to realize the mobility restriction of the user terminal, a mobility access classifier is added to the subscription relation of the user and includes fixed, nomadic, and mobile services. The mobile service means that when the user terminal moves within the coverage of the network side at a certain speed, the user terminal can use the data service of the network continuously, and the network side supports the handover of the user terminal and ensures the session continuity during the handover. The nomadic service means that the user terminal can access the network at different geographic locations. During the data service session, the user terminal is usually attached to a certain access network fixedly, and when the user terminal moves to a new location, it is required to access the network once again, so as to realize a new data service session. Therefore, the user terminal of the nomadic service is enabled to initiate the re-attachment of the device, but does not necessarily ensure the session continuity. The fixed service means that the user terminal can merely access the network in a fixed area for realizing the data service, and when the user terminal leaves the fixed area, the user terminal cannot access the network.

As for certain operators in some countries, due to the license restrictions, the operators can merely operate fixed or nomadic network services. Therefore, the mobility of the user terminals for the fixed and nomadic users is required to be restricted.

The inventor(s) of the present invention found that, in the prior art, after a mobile user terminal roams to a visited network with mobility restriction, or roams to a network without mobility restriction from a network with mobility restriction, for example, after the mobile user terminal roams to a network merely supporting fixed or nomadic users, or after a nomadic network user terminal roams to a network without mobility restriction, the mobility type of the roaming user terminal cannot be determined, so that the roaming user terminal cannot access a network with mobility restriction, or the user terminal of the network with mobility restriction cannot access a network without mobility restriction.

SUMMARY OF THE INVENTION

The present invention is directed to a method and a device for determining mobility of a roaming user terminal, which are applicable to determine a mobility restriction type of the user terminal after the roaming of the user terminal.

The present invention adopts the following technical solutions.

The present invention provides a method for determining mobility of a roaming user terminal, which includes the following steps. A visited network AAA (V-AAA) server receives an Access-Accept message corresponding to the user terminal sent from a home network AAA (H-AAA) server. The V-AAA server determines a mobility access classifier of the user terminal according to a mobility restriction policy of a visited network CSN, and sends the Access-Accept message to a visited ASN authenticator, in which the Access-Accept message carries the mobility access classifier of the user terminal.

The present invention provides a method for determining mobility of a roaming user terminal, which includes the following steps. A visited ASN authenticator receives an Access-Accept message corresponding to the user terminal sent from a V-AAA server. The visited ASN authenticator determines a mobility access classifier of the user terminal according to a mobility restriction policy of the visited ASN, and sends the mobility access classifier of the user terminal to a BS.

The present invention provides a method for determining mobility of a roaming user terminal, which includes the following steps. An H-AAA server receives an Access-Request message corresponding to the user terminal from a V-AAA server, in which the Access-Request message carries a mobility restriction policy of a visited ASN. The H-AAA server determines a mobility access classifier of the user terminal according to the mobility restriction policy of the visited ASN. The H-AAA server sends an Access-Accept message to the V-AAA server, in which the Access-Accept message carries the mobility access classifier of the user terminal, or carries the mobility access classifier and mobility restriction associated parameters of the user terminal.

The present invention provides an AAA server, which includes a receiving module, a determining module, and a sending module. The receiving module is configured to receive an Access-Accept message corresponding to a user terminal sent from an H-AAA server. The determining module is configured to determine a mobility access classifier of a user terminal according to a mobility restriction policy of a visited CSN. The sending module is configured to send the Access-Accept message to a visited ASN authenticator, in which the Access-Accept message carries the mobility access classifier of the user terminal, or carries the mobility access classifier and mobility restriction associated parameters of the user terminal.

The present invention provides an authenticator, which includes a receiving module, a determining module, and a sending module. The receiving module is configured to receive an Access-Accept message corresponding to a user terminal sent from a V-AAA server. The determining module is configured to determine a mobility access classifier of a user terminal according to a mobility restriction policy of a visited ASN. The sending module is configured to send the mobility access classifier of the user terminal or the mobility access classifier and mobility restriction associated parameters of the user terminal to a BS.

The present invention provides an AAA server, which includes a receiving module, a determining module, and a sending module. The receiving module is configured to receive an Access-Request message corresponding to a user terminal sent from a V-AAA server, in which the Access-Request message carries a mobility restriction policy of a visited ASN. The determining module is configured to determine a mobility access classifier of a user terminal according to the mobility restriction policy of the visited ASN. The sending module is configured to send an Access-Accept message to the V-AAA server, in which the Access-Accept message carries the mobility access classifier of the user terminal, or carries the mobility access classifier and mobility restriction associated parameters of the user terminal.

In the method and the device for determining mobility of a roaming user terminal according to the embodiments of the present invention, after the user terminal roams to a visited network with mobility restriction, or roams to a network without mobility restriction from a network with mobility restriction, the mobility restriction type of the user terminal can be determined timely, and the visited network can acquire the mobility restriction information of the user terminal.

BRIEF DESCRIPTION OF THE DRAWINGS

In order to make the technical solution under the present invention clearer, the accompanying drawings for illustrating the embodiments of the present invention or the prior art are outlined below. Evidently, the accompanying drawings are for the exemplary purpose only, and those skilled in the art can derive other drawings from such accompanying drawings without any creative effort.

DETAILED DESCRIPTION OF ILLUSTRATIVE EMBODIMENTS

The following detailed description is directed to the technical solution of the present invention with reference to the accompanying drawings. However, the embodiments to be described are only part of, rather than all of, the embodiments of the present invention. All other embodiments, which can be derived by those skilled in the art from the embodiments given herein without any creative efforts, fall within the scope of the present invention.

The present invention provides a method and a device for determining mobility of a roaming user terminal, which are applicable to determine a mobility restriction type of the user terminal after the roaming of the user terminal, and enable the visited network to acquire mobility restriction information of the user terminal, so as to further realize the network entry of the user terminal successfully.

First Embodiment

In this embodiment, a V-AAA server determines a mobility access classifier of a user terminal MS/SS.

Figure 1:
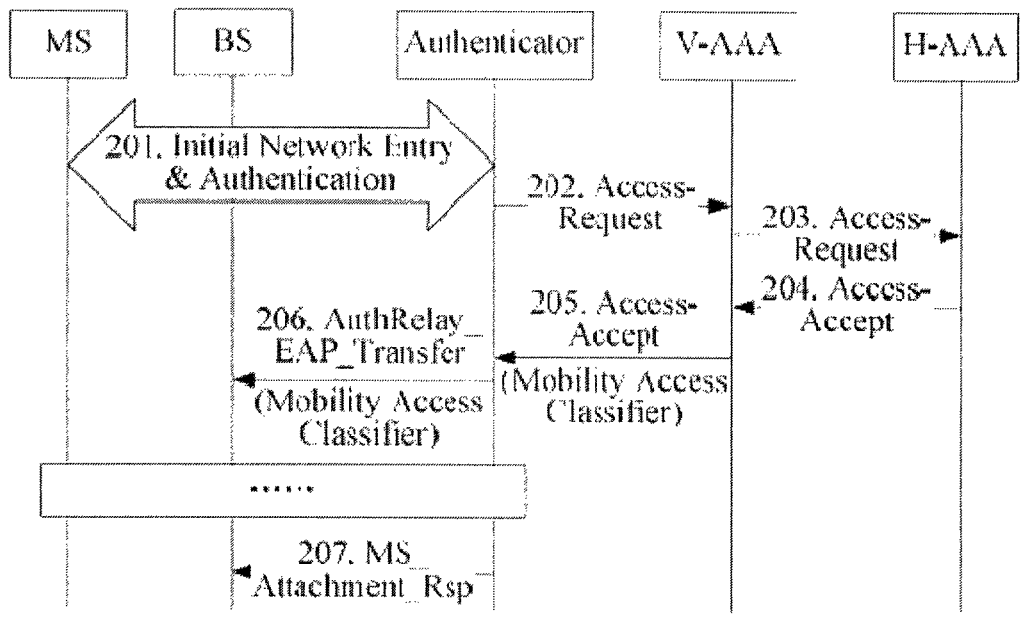
FIG. 1 is a flow chart of a method for determining mobility of a roaming user terminal according to a first embodiment of the present invention.

Referring to FIG. 1, the method for determining mobility of a roaming user terminal according to the first embodiment of the present invention includes the following steps.

In step 201, after moving to a visited network, an MS initiates an initial network entry interaction process, which belongs to the prior art and is not described herein.

In step 202, a visited network authenticator sends an Access-Request message to a V-AAA server.

In step 203, the V-AAA server sends the Access-Request message in step 202 to an H-AAA server.

In step 204, if the H-AAA server permits the MS to access the network, the H-AAA server sends an Access-Accept message carrying an access success indication to the V-AAA server.

In step 205, the V-AAA server determines a mobility access classifier of the MS according to a mobility restriction policy of a visited CSN, carries the mobility access classifier of the MS in the Access-Accept message, and delivers the Access-Accept message to the authenticator.

The Access-Accept message may further carry mobility restriction associated parameters of the MS.

The mobility restriction policy is saved in a visited ASN authenticator, and includes specific mobility access classifier users supported by the visited ASN, for example, mobile, nomadic, or fixed users. The mobility restriction associated parameters of the MS are corresponding to the mobility access classifier of the MS, and are mainly associated with fixed or nomadic users, which may include at least one selected from a permit entry zone, a reattachment zone, a parameter of whether supporting a session continuity, and the like.

In step 206, the authenticator sends an AuthRelay_EAP_Transfer message to a BS. The message carries the mobility access classifier of the MS, which may further carry the mobility restriction associated parameters of the MS.

Alternatively, in step 207, the authenticator sends an MS_Attachment_Rsp message to the BS. The message carries the mobility access classifier of the MS, which may further carry the mobility restriction associated parameters of the MS.

Either step 206 or step 207 may be selected to send the mobility access classifier of the MS and the mobility restriction associated parameters of the MS carried in the message to the BS of the visited ASN.

The BS of the visited ASN acquires the mobility access classifier and the mobility restriction associated parameters of the MS, and the MS is enabled to perform the subsequent network entry process.

In this embodiment, the visited V-AAA server directly determines the mobility access classifier and the corresponding mobility restriction information of the MS, and delivers the mobility access classifier and the corresponding mobility restriction information of the MS to the ASN.

Second Embodiment

In this embodiment, a visited network authenticator determines a mobility access classifier of an MS.

Figure 2:
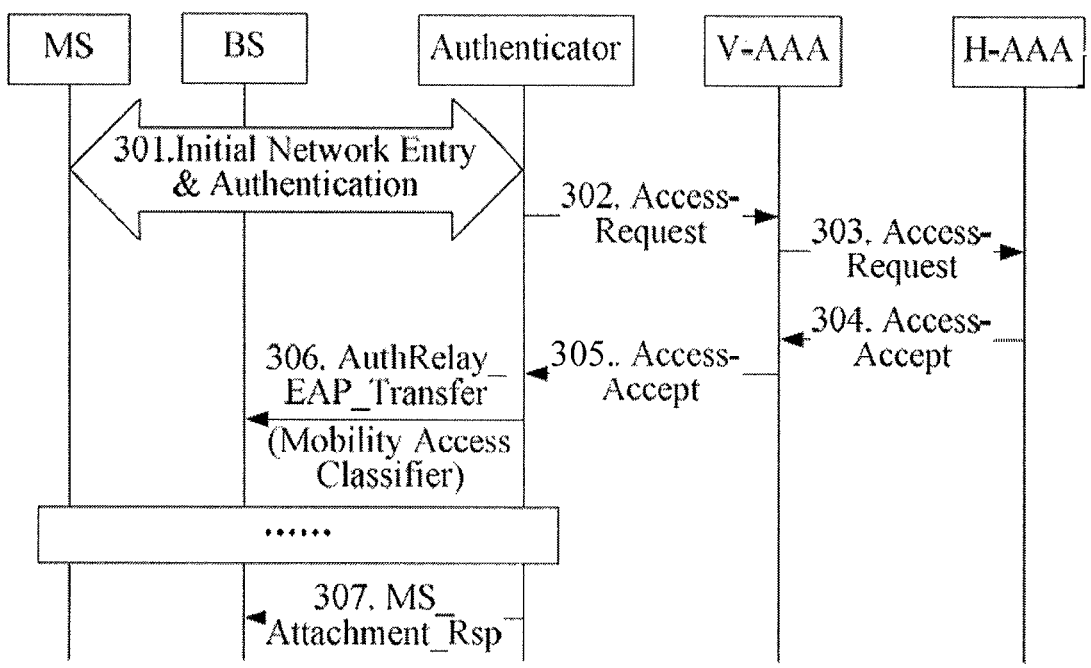
FIG. 2 is a flow chart of a method for determining mobility of a roaming user terminal according to a second embodiment of the present invention.

The flow chart of the method according to this embodiment is similar to that of the first embodiment. Referring to FIG. 2, the method includes the following steps.

In step 301, an MS performs an initial network entry interaction process, which is similar to step 201.

In step 302, a visited network authenticator sends an Access-Request message to a V-AAA server.

In step 303, the V-AAA server sends the Access-Request message in step 302 to an H-AAA server.

In step 304, if the H-AAA server permits the MS to access the network, the H-AAA server sends an Access-Accept message carrying an access success indication to the V-AAA server.

In step 305, the V-AAA server sends the Access-Accept message received in step 304 to the authenticator.

In step 306, the authenticator determines a mobility access classifier of the MS according to a mobility restriction policy of a visited ASN, and sends an AuthRelay_EAP_Transfer message to a BS. The message carries the mobility access classifier of the MS, which may further carry mobility restriction associated parameters of the MS.

Alternatively, in step 307, the authenticator sends an MS_Attachment_Rsp message to the BS. The message carries the mobility access classifier of the MS, which may further carry the mobility restriction associated parameters of the MS.

The mobility restriction policy is saved in a visited ASN authenticator, and includes specific mobility access classifier users supported by the visited ASN, for example, mobile, nomadic, or fixed users. The mobility restriction associated parameters of the MS are corresponding to the mobility access classifier of the MS, and are mainly associated with fixed or nomadic users, which may include at least one selected from a permit entry zone, a reattachment zone, a parameter of whether supporting a session continuity, and the like.

The BS of the visited ASN acquires the mobility access classifier and the mobility restriction associated parameters of the MS, and the MS is enabled to perform the subsequent network entry process.

In this embodiment, the visited ASN determines the mobility access classifier and the corresponding mobility restriction information of the MS and delivers the mobility access classifier and the corresponding mobility restriction information of the MS to the BS.

Third Embodiment

In this embodiment, an H-AAA server determines a mobility access classifier of an MS.

Figure 3:
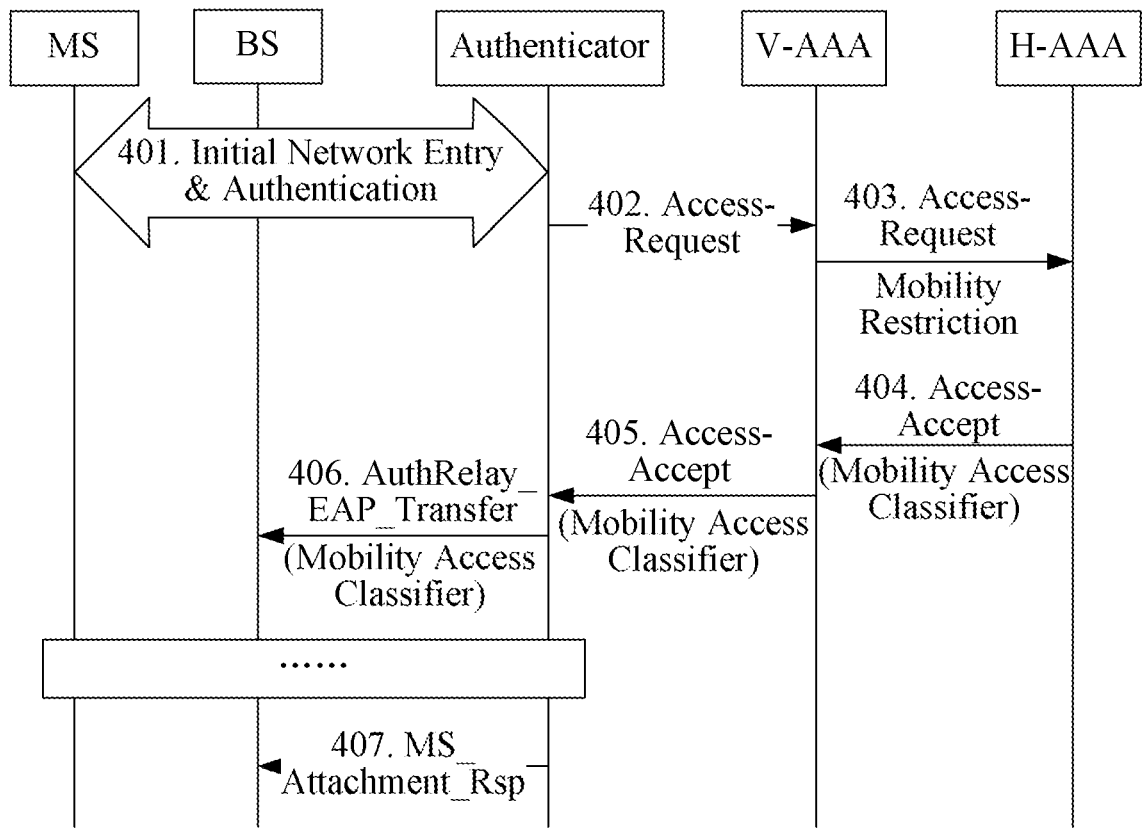
FIG. 3 is a flow chart of a method for determining mobility of a roaming user terminal according to a third embodiment of the present invention.

The flow chart of the method according to this embodiment is similar to that of the first embodiment. Referring to FIG. 3, the method includes the following steps.

In step 401, after moving to a visited network, an MS initiates an initial network entry interaction process, which belongs to the prior art and is not described herein.

In step 402, a visited network authenticator sends an Access-Request message to a V-AAA server. The Access-Request message carries a mobility restriction policy of a visited ASN, which may further carry mobility restriction associated parameters of the MS.

The mobility restriction policy is saved in a visited ASN authenticator, and includes specific mobility access classifier users supported by the visited ASN, for example, mobile, nomadic, or fixed users. The mobility restriction associated parameters of the MS are corresponding to the mobility access classifier of the MS, and are mainly associated with fixed or nomadic users, which may include at least one selected from a permit entry zone, a reattachment zone, a parameter of whether supporting a session continuity, and the like.

In step 403, the V-AAA server receives the Access-Request message and forwards the Access-Request message to an H-AAA server.

In step 404, if the H-AAA server permits the MS to access the network, the H-AAA server determines a mobility access classifier of the MS according to the mobility restriction policy of the visited ASN carried in the received Access-Request message, for example, determines whether the MS is a fixed user or a nomadic user, and carries the mobility access classifier of the MS in an Access-Accept message and delivers the Access-Accept message to the V-AAA server.

If the Access-Request message carries the mobility restriction associated parameters of the MS in step 402, the Access-Accept message further carries the mobility restriction associated parameters of the MS, for example, parameters associated with fixed or nomadic users, which include at least one selected from a permit entry zone, a reattachment zone, a parameter of whether supporting a session continuity, and the like.

In step 405, the V-AAA server receives the Access-Accept message and forwards the Access-Accept message to the authenticator.

In step 406, the authenticator sends an AuthRelay_EAP_Transfer message to a BS. The message carries the mobility access classifier of the MS, which may further carry the mobility restriction associated parameters of the MS.

Alternatively, in step 407, the authenticator sends an MS_Attachment_Rsp message to the BS. The message carries the mobility access classifier of the MS, which may further carry the mobility restriction associated parameters of the MS.

As known from the above steps, in this embodiment, the visited ASN reports the mobility restriction of the network to the V-AAA server, the V-AAA server forwards the mobility restriction of the network to the H-AAA server, and the H-AAA server determines the mobility access classifier and corresponding mobility restriction information of the MS according to the capability of the visited network, and then delivers the mobility access classifier and the corresponding mobility restriction information of the MS to the visited network.

Figure 4:
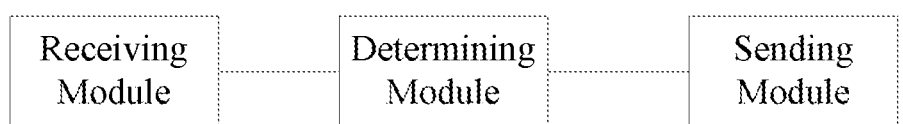
FIG. 4 is a schematic view of a device for determining mobility of a roaming user terminal according to an embodiment of the present invention.

Corresponding to the V-AAA server in the first embodiment, the present invention further provides an AAA server. Referring to FIG. 4, the AAA server includes a receiving module, a determining module, and a sending module.

The receiving module is configured to receive an Access-Accept message sent from an H-AAA server.

The determining module is configured to determine a mobility access classifier of a user terminal according to a mobility restriction policy of a visited CSN.

The sending module is configured to send the Access-Accept message to a visited ASN authenticator. The Access- Accept message carries the mobility access classifier of the user terminal, or carries the mobility access classifier and mobility restriction associated parameters of the user terminal.

Corresponding to the authenticator in the second embodiment, the present invention further provides an authenticator. Referring to FIG. 4, the authenticator includes a receiving module, a determining module, and a sending module.

The receiving module is configured to receive an Access-Accept message sent from a V-AAA server.

The determining module is configured to determine a mobility access classifier of a user terminal according to a mobility restriction policy of a visited ASN.

The sending module is configured to send the mobility access classifier of the user terminal or the mobility access classifier and mobility restriction associated parameters of the user terminal to a BS.

Corresponding to the H-AAA server in the third embodiment, the present invention further provides an AAA server. Referring to FIG. 4, the AAA server includes a receiving module, a determining module, and a sending module.

The receiving module is configured to receive an Access-Request message sent from a V-AAA server, in which the Access-Request message carries a mobility restriction policy of a visited ASN.

The determining module is configured to determine a mobility access classifier of a user terminal according to the mobility restriction policy of the visited ASN.

The sending module is configured to send an Access-Accept message to the V-AAA server, in which the Access-Accept message carries the mobility access classifier of the user terminal, or carries the mobility access classifier and mobility restriction associated parameters of the user terminal.

In the method and the device for determining mobility of a roaming user terminal according to the embodiments of the present invention, after the user terminal roams to a visited network with mobility restriction, or roams to a network without mobility restriction from a network with mobility restriction, the mobility restriction type of the user terminal can be determined timely, and the BS of the visited network can acquire the mobility restriction information of the user terminal. Furthermore, the network entry of the user terminal can be realized successfully, and the mobile range of the roaming user terminal can be restricted after the network entry.

Through the above description of the implementation, it is apparent to persons skilled in the art that the present invention may be accomplished through software plus a necessary universal hardware platform, or accomplished through hardware. In most cases, the former mode is better. Based on this, the technical solution of the present invention or the part that makes contributions to the prior art can be substantially embodied in the form of a software product. The computer software product may be stored in the readable storage media, for example, a floppy disk, hard disk, or optical disk of the computer, and contain several instructions configured to instruct computer equipment (for example, a personal computer, a server, or network equipment) to perform the method according to the embodiments of the present invention.

Detailed above are the objectives, technical solution and merits of the present invention. Although the invention has been described through several exemplary embodiments, the invention is not limited to such embodiments. Any modification, equivalent replacement, or improvement made without departing from the spirit and principle of the present invention should fall within the scope of the present invention.

What is claimed is:

1. A method for determining mobility of a roaming user terminal, the method comprising:
   receiving, by a visited access service network (ASN) authenticator, an Access-Accept message corresponding to the user terminal sent from a visited network authentication, authorization and accounting (V-AAA) server; and
   determining a mobility access classifier of the user terminal according to a mobility restriction policy of the visited ASN, and sending the mobility access classifier of the user terminal to a base station (BS),
   wherein the Access-Accept message further carries mobility restriction associated parameters of the user terminal,
   wherein the authenticator communicates the mobility access classifier and the mobility restriction associated parameters of the user terminal in an AuthRelay_EAP_Transfer message or an MS_Attachment_Rsp message and sends the AuthRelay_EAP_Transfer message or MS_Attachment_Rsp message to the BS, and
   wherein the mobility access classifier is a fixed, nomadic, or mobile classifier, and the mobility restriction associated parameters are parameters associated with fixed or nomadic users and comprise at least one selected from a permit entry zone, a reattachment zone, and a parameter of whether supporting a session continuity.

2. A method for determining mobility of a roaming user terminal, the method comprising:
   receiving, by a visited network authentication, authorization and accounting (V-AAA) server, an Access-Accept message corresponding to the user terminal sent from a home network authentication, authorization and accounting (H-AAA) server;
   determining a mobility access classifier of the user terminal according to a mobility restriction policy of a visited connectivity service network (CSN); and
   sending the Access-Accept message to a visited access service network (ASN) authenticator, wherein the Access-Accept message carries the mobility access classifier of the user terminal,
   wherein the Access-Accept message further carries mobility restriction associated parameters of the user terminal,
   wherein the authenticator communicates the mobility access classifier and the mobility restriction associated parameters of the user terminal in an AuthRelay_EAP_Transfer message or an MS_Attachment_Rsp message and sends the AuthRelay_EAP_Transfer message or MS_Attachment_Rsp message to a base station, and
   wherein the mobility access classifier is a fixed, nomadic, or mobile classifier, and the mobility restriction associated parameters are parameters associated with fixed or nomadic users and comprise at least one selected from a permit entry zone, a reattachment zone, and a parameter of whether supporting a session continuity.

3. The method according to claim 2, further comprising sending the mobility access classifier and the mobility restriction associated parameters of the user terminal from the authenticator to a base station.

* * * * *